April 17, 1945.  T. W. EVANS ET AL  2,373,951
FOAM PREVENTION IN VAPOR PHASE EXTRACTION PROCESSES
Filed Jan. 31, 1942
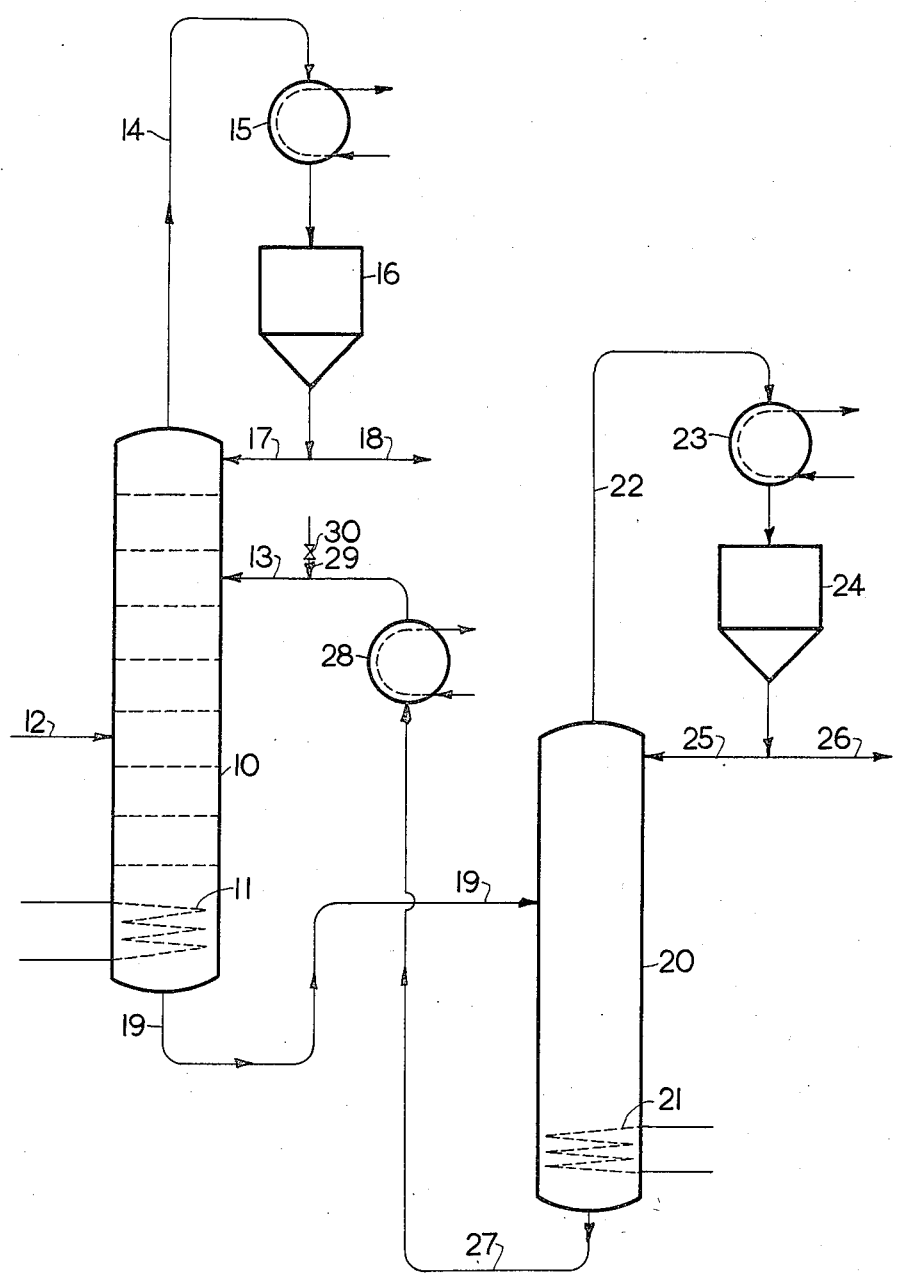
Inventors: Theodore W. Evans
Rupert C. Morris
By their Attorney:

UNITED STATES PATENT OFFICE 2,373,951

FOAM PREVENTION IN VAPOR PHASE EXTRACTION PROCESSES

Theodore W. Evans, Oakland, and Rupert C. Morris, Berkeley, Calif., assignors to Shell Development Company, San Francisco, Calif., a corporation of Delaware Application January 31, 1942, Serial No. 429,045

10 Claims. (Cl. 183—115)

This invention relates to a method for the prevention of foaming in processes for the vapor phase extraction of hydrocarbon mixtures. More particularly, this invention involves contacting the hydrocarbon mixture in its vapor phase with a selective liquid solvent in the presence of a mineral lubricating oil or a fatty oil as a defoaming agent for said solvent.

The hydrocarbon mixtures referred to herein particularly comprise those hydrocarbon mixtures whose components boil within a narrow temperature range and are often impossible to separate by ordinary distillation methods. These mixtures may comprise normally gaseous or normally liquid hydrocarbons. However, the liquid mixtures must be vaporized before or while being separated. Normally gaseous compounds are considered to be those compounds which are gases under ordinary conditions of temperature and pressure (approximately 20° C. and atmospheric pressure). Some mixtures which may be advantageously fractionated, separated, or purified by these vapor phase extraction processes are: aromatic hydrocarbons such as benzene, toluene, ethyl benzene, xylenes, para-cymene, naphthalene, isomeric methyl naphthalenes, and the like, from petroleum hydrocarbon distillates; gasoline fractions of narrow boiling ranges; sulfur compounds from gasolines; mixtures of isomeric compounds; constant boiling mixtures; and particularly mixtures of substances of different degrees of saturation, such as diolefins, acetylenes, etc., from mono-olefins, paraffins and the like, more specifically the separation of acetylene from ethane or ethylene, ethylene from ethane, propylene from propane, n-butylenes from n-butane, isbutylene from isobutane, butadiene from alpha and beta butylenes, butane, etc.; pentadienes such as isoprene or piperylene from fractions containing five carbon atoms, such as pentene; cyclopentadiene from cyclopentane, pentenes, etc.

The vapor phase extraction processes improved by this invention essentially comprise contacting vapors of the hydrocarbon mixture to be separated with a selective solvent having preferential solvent power for certain of the components of said mixture and having a higher boiling temperature than said mixture. These processes may be effected generally in any one of several different ways, e. g. by so-called scrubbing, absorption, or extractive distillation. Both scrubbing and absorption comprise contacting the hydrocarbon vapor mixture in a spray, packed or bubble plate column with a stream of selective solvent flowing countercurrently to the vapor. This produces a fat solvent containing the absorbed component as distinguished from the lean solvent which enters the column. Scrubbing and absorption differ in that no bottom reflux or backwash is employed in a scrubbing column.

Extractive distillation comprises fractional distillation of the hydrocarbon mixture wherein the vapor pressure of one of the components of said mixture is depressed more than that of the other through contact with a higher boiling liquid, viz. the selective solvent, to produce a fat solvent. Extractive distillation differs from scrubbing and absorption in that, in the former, a liquid reflux is employed at the top of the column and normally a temperature gradient is maintained in the column.

In the above methods the dissolved components are recovered from the fat solvent by distillation. The lean solvent which is thus produced may be recirculated.

Some of the many different solvents which have preferential solvent power for different hydrocarbons and which may be used in such extractive processes are: dioxane, nitromethane, acetonitrile, lactonitrile, acetone, methyl ethyl ketone, actonyl acetone, phenol, aniline, noitrobenzene, methyl alcohol, furfural, morpholine, 1,3-butylene glycol, 2,2-dichlorethyl ether, aqueous solutions of ammoniacal cuprous chloride, and aqueous cuprous chloride with a small amount of ethanol amine.

It is not always necessary to employ a pure or concentrated solvent. Sometimes selectivity of a given solvent for a particular component in a mixture can be increased by the addition of some second agent which modifies the solvent properties of the solvent. For example, butadiene can be separated from butylene by employing an acetone-water mixture as a solvent. Some other solvents which give increased efficiency by the addition of water thereto are morpholine, dioxane, methyl ethyl ketone, lactonitrile, phenol, methyl alcohol, ethylene glycol, 1,3-butylene glycol, and acetonyl acetone. Of all these, water solutions of acetone are preferred because of their ready availability and high degree of selectivity for diolefins.

The optimum amount of water to be added to a solvent to improve it varies with the particular solvent in question and with the substances to be separated. In general, amounts between 5% and 35%, and preferably between 7% and 25%, are suitable. The most suitable amount for a given separation may be found by experiment, as the result of a compromise between the reduced solubility of the unsaturated hydrocarbon in the solvent and the increased degree of selectivity for the hydrocarbon.

Previously, the efficiency of such vapor phase extraction processes has been impaired by the foaming of the solvent in the extraction or contact zone in the process, thereby decreasing the effective rate of flow of the gaseous mixture or the vapors through the selective solvent. Foaming appears especially in solvents which have been modified by agents, such as water. Foaming is undesirable because it produces what is called "carry over" in a column. This is caused by the vapor carrying the solvent foam up the column, thereby destroying the extractive effect of the column. In the past, "carry over" has been prevented (1) by decreasing the rate of flow through the column, or (2) by increasing the diameter of the bubble plates in a column as well as the distance between them so that enough space is allowed for the foam to break before its enclosed vapors pass up to the bubble plate above.

It is an object of this invention to substantially improve the economy and efficiency of vapor phase extraction processes employed in the separation of hydrocarbon compounds of narrow boiling range. Another object of this invention is to increase the speed of operation of such processes. A further object of this invention is to increase the effectiveness of the selective solvent in the contact zone of the processes by preventing "carry over."

These objects are carried out by effecting the extraction in the presence of a particular class of defoaming agents. We have found that a defoaming agent to be effective in our process must possess the following characteristics: It must be substantially insoluble in both the fat and the lean selective solvent; insolubility of the agent in the fat solvent is important because hydrocarbons may increase the capacity of the solvent to dissolve the defoaming agent. It must not substantially react with any of the substances employed in the process. It must be a liquid in the contact zone and have a boiling temperature substantially above that of said hydrocarbon vapors. It must be substantially stable under the conditions employed in the process. And it must readily disperse throughout the solvent, particularly throughout the fat solvent in the contact zone.

Most of the commonly known defoaming agents fail to meet one or more of the above required characteristics. In particular, most of them are soluble in the selective solvents herein described. Some of the commonly known defoaming agents which have been found to be ineffective in these processes are: light mineral oils such as toluene and kerosene; higher alcohols such as n-octanol, n-decanol, 2-ethyl hexanol; sulfonated vegetable oils such as Turkey red oil, sulfonated castor oil and sulfonated olive oil; sodium alkyl naphthalene sulfonate; stearic, palmitic and other higher fatty acids; soaps; and the like.

The particular defoaming agents found to be effective in the vapor phase extraction processes involved in this invention are members of the class consisting of mineral lubricating oils and fatty oils possessing viscosities (Saybolt Universal at 100° F.) of above approximately 75 seconds. Preferred mineral lubricating oils of this class have viscosities between about 150 and about 450 seconds S. U. at 100° F. Paraffinic mineral lubricating oils are in general preferred because the solvents normally employed are solvents having selective solvent powers for aromatics.

These agents include oils of this class which have been refined by distillation and/or chemical treatment.

A table is presented below showing the specific gravity, viscosity and solubility of a few representative oils of this class. The solubility tests were run employing an 80% acetone-20% water solvent solution because this solution is a representative solvent used in vapor phase extraction processes of the type involved in this invention.

|  | Specific gravity at 60°/60° F. | Saybolt Universal viscosity at 70° F. in seconds | Solubility in an 80% acetone-20% water solution |
|---|---|---|---|
| Mineral lubricating oils: | | | |
| White oil No. 1 | .887–.898 | 330–350 | Insoluble. |
| White oil No. 2 | .848–.865 | 75–85 | Substantially insoluble. |
| White oil No. 3 | .837–.858 | 50–60 | Partly soluble. |
| Fatty oils: | | | |
| Castor oil | .960–.967 | 1,000–1,500 | Substantially insoluble. |
| Sunflower seed oil | .924–.926 | 600 | Insoluble. |
| Linseed oil (raw) | .931–.934 | 575–600 | Do. |
| Soybean oil | .924 | 600 | Do. |
| Peanut oil | .917–.926 | 350–475 | Do. |
| Tung oil | .939–.949 | 1,000–1,450 | Do. |

White oil No. 3 in the above table is not an effective defoaming agent because in the exceedingly small quantities used it dissolves in the 80% acetone-20% water solvent solution. White oil No. 3 also possesses the lowest viscosity among the oils shown.

The amounts of any one of the described agents to prevent foaming of the solvent varies with different hydrocarbon mixtures, with different solvents, with temperature, and with pressure. In general, however, it has been found suitable to employ amounts ranging between about .05 and 5 parts per 1,000 parts by volume of the solvent, and preferably amounts between about .1 and 2 parts per thousand.

The defoaming agents employed in this invention apparently do not change the surface tension of the solvent. They are substantially insoluble and form a visible suspension of small droplets in the solvent, which suspension is maintained throughout the entire process.

The accompanying drawing is illustrative of a flow diagram of an extractive distillation process in which a defoaming agent of the type disclosed in this invention may be employed.

Referring to the diagram, 10 is the contact zone of a bubble plate fractionating column having a reboiler 11 at its bottom, hydrocarbon feed line 12, feed line 13 for the lean solvent and the defoaming agent, vapor line 14 connected to condenser 15 and accumulator 16, reflux line 17, and fat solvent exit line 19. The solvent regenerator or column 20 has a reboiler 21, feed line 19, vapor line 22, condenser 23, accumulator 24, reflux line 26, and lean solvent exit line 27. 28 is a heat exchanger and 29 a feed line with valve 30, which may be used for introducing fresh solvent and more of the defoaming agent.

In effecting the continuous separation or purification of a mixture of hydrocarbons of narrow boiling range, the vapor mixture enters the column 10 through line 12, and contacts the descending solvent containing the defoaming agent, and the ascending vapor of the more soluble components of the mixture driven out of the solvent by the heat of the reboiler 11. This reboiler provides a reflux for the bottom of the column. As the hydrocarbon feed vapors pass up through the column, they are stripped of their more soluble components by absorption in the descending solvent. The undissolved vapors then pass off through the vapor line 14, are condensed in condenser 15, and are collected in the accumulator 16 from which a reflux is provided for the top of the column through line 17, as well as a discharge line 18 for the remaining unextracted product.

The component of the vapor mixture dissolved in the column passes out through line 19 in the fat solvent solution with the defoaming agent to be separated therefrom in column 20. Here the incoming fat solvent solution is contacted with the rising vapors of dissolved component from the heat of the reboiler 21, thereby stripping the dissolved component from the solvent. These vapors pass off through vapor line 22, are condensed in condenser 23 and are collected in the accumulator 24 to provide a reservoir for the reflux through line 25 over the top of column 20 and for the discharge of the remaining extracted pure product through line 26. The stripped solvent containing the dispersed defoaming agent collects in the bottom of column 20 and from there passes through line 27 to heat exchanger 28 where it is cooled before entering the contact zone or column 10 through line 13. The defoaming agent remains suspended in the solvent throughout the entire cycle of the latter.

In general, it is preferred to operate at a temperature substantially below the boiling temperature of the solvent but slightly above the condensation temperature of the most readily condensible constituent of the vapor at the existing pressure. For example, as found by experiment when employing a 20% water-80% acetone solution as solvent for the separation of butadiene from butylenes, about 20° C. is normally suitable. Substantially atmospheric pressures may be maintained, though the extraction may be carried out either at super- or sub-atmospheric pressure if care is taken to adjust the temperature so that the mixture to be extracted does not condense and the solvent does not vaporize excessively. It is sometimes desirable to operate under superatmospheric pressure. For example, when operating under 25–100 pounds per square inch gauge pressure for butadiene separation, not only is the column size reduced but also the thermal requirements compared to those needed at atmospheric pressure are appreciably lowered. Both a superatmospheric pressure and a high temperature aid the defoaming agent in suppressing the formation of foam in the system. The temperatures and pressures mentioned above are by no means limitative but are merely illustrative. Higher temperatures and pressures may be employed provided the ingredients employed in the process do not decompose, polymerize, or undergo other chemical change under such conditions.

These processes which employ the defoaming agent of this invention may be performed either as batch or continuous processes. The apparatus used in performing these vapor phase extractive processes may be any conventional or convenient structure or design that will safely permit the use of the pressures, the temperatures and the rate of flow necessary for effecting the processes. However, in the contact zone and in the regenerator, bubble plate fractionating columns are preferred because of their high efficiency.

The following specific example shows the advantage of employing the defoaming agent of this invention in the vapor phase extraction processes.

*Example*

A butane-butylene mixture was extractively distilled in a 40-bubble-plate fractionating column which had a reboiler at its bottom. The feed was a gaseous mixture of 56% butane and 44% butylene, and was introduced into the column on the 11th plate at the rate of about 350 volume parts of gas per minute. The selective solvent employed was an aqueous mixture of acetone consisting of 80% acetone by weight and 20% water by weight. The solvent entered the top of the column at a rate of 20 volume parts of liquid per minute. After equilibrium was established in the column, and before any defoaming agent was added, a considerable height of foam was on the plates in the column. Then a defoaming agent was introduced into the column on the 21st plate at the rate of about .1 volume part per hour. The defoaming agent used was a white highly refined mineral lubricating oil having a Saybolt Universal viscosity at 100° F. of from 330 to 350 seconds. The foam broke immediately on this 21st plate and subsequently on those plates below it as the solvent gradually proceeded down the column. The defoaming agent dispersed throughout the solvent as small visible droplets. The height of the liquid on the plates after the introduction of the mineral oil was only the normal operating minimum necessary for efficient operation of the column.

We claim as our invention:

1. In a method of preventing foaming in a process for separating unsaturated hydrocarbons from more saturated hydrocarbons in a mixture by vapor phase extraction with a selective solvent for said unsaturated hydrocarbons, said solvent having a boiling temperature substantially above that of said mixture, the improvement comprising contacting said mixture in the vapor phase with said solvent in the liquid state under conditions to dissolve at least a portion of said unsaturated hydrocarbons and to form a fat solvent containing dissolved hydrocarbons, in the presence of a relatively small amount of an agent selected from the group consisting of mineral lubricating oils and fatty oils, said agent being substantially insoluble in said fat solvent, having a Saybolt Universal viscosity at 100° F. of greater than about 75 seconds, and having a boiling temperature substantially above that of said mixture.

2. The method of claim 1 wherein the selective solvent comprises an aqueous solution of an organic compound.

3. The method of claim 1 wherein the amount of said agent ranges between about .05 and about 5 parts per thousand of said selective solvent by volume.

4. The method of claim 1 wherein the selective solvent comprises an aqueous solution of acetone, said aqueous acetone solution comprising at least 5% and not more than 35% water by weight.

5. In a method of preventing foaming in a process for separating unsaturated hydrocarbons from more saturated hydrocarbons in a mixture by vapor phase extraction with a selective solvent for said unsaturated hydrocarbons, said solvent having a boiling temperature substantially above that of said mixture, the improvement comprising contacting said mixture in the vapor phase with said solvent in the liquid state under conditions to dissolve at least a portion of said unsaturated hydrocarbons and to form a fat solvent containing dissolved hydrocarbons, in the presence of a relatively small amount of a mineral lubricating oil, said oil being substantially insoluble in said fat solvent, having a Saybolt Universal viscosity at 100° F. of greater than about 75 seconds and having a boiling temperature substantially above that of said mixture.

6. The method of claim 5 wherein said oil is a refined white mineral lubricating oil.

7. In a method of preventing foaming in a process for separating unsaturated hydrocarbons from more saturated hydrocarbons in a mixture by vapor phase extraction with a selective solvent for said unsaturated hydrocarbons, said solvent having a boiling temperature substantially above that of said mixture, the improvement comprising contacting said mixture in the vapor phase with said solvent in the liquid state under conditions to dissolve at least a portion of said unsaturated hydrocarbons and to form a fat solvent containing dissolved hydrocarbons, in the presence of a relatively small amount of a fatty oil, said oil being substantially insoluble in said fat solvent and having a Saybolt Universal viscosity at 100° F. of greater than about 75 seconds.

8. The method of claim 7 wherein the amount of said oil ranges between about .05 and about 5 parts per thousand of said selective solvent by volume.

9. In a method of preventing foaming in a process for separating butadiene from a mixture of hydrocarbons consisting essentially of 4 carbon atoms per molecule by vapor phase extraction with a selective solvent for said butadiene, said solvent having a boiling temperature substantially above that of said mixture, the improvement comprising contacting said mixture in the vapor phase with said solvent in the liquid state under conditions to dissolve at least a portion of said butadiene and to form a fat solvent containing a substantial amount of dissolved butadiene, in the presence of a relatively small amount of an agent selected from the group consisting of mineral lubricating oils and fatty oils, said agent being substantially insoluble in said solvent, and having a Saybolt Universal viscosity at 100° F. of greater than about 75 seconds.

10. In a method of preventing foaming in a process for separating butadiene from a mixture of hydrocarbons consisting essentially of four carbon atoms per molecule by vapor phase extraction with a selective solvent for said butadiene, said solvent having a boiling temperature substantially above that of said mixture and comprising an aqueous solution of acetone, said aqueous acetone solution comprising at least 7% and not more than 25% water by weight, the improvement comprising contacting said mixture in the vapor phase with said solvent in the liquid state under conditions to dissolve at least a portion of said butadiene and to form a fat solvent containing a substantial amount of dissolved butadiene, in the presence of a relatively small amount of a white mineral lubricating oil, said amount ranging between about .1 and 2 parts per thousand of said solvent by volume, said oil being substantially insoluble in said fat solvent and having a Saybolt Universal viscosity at 100° F. of between about 150 and about 450 seconds.

THEODORE W. EVANS.
RUPERT C. MORRIS.